Figure 14:
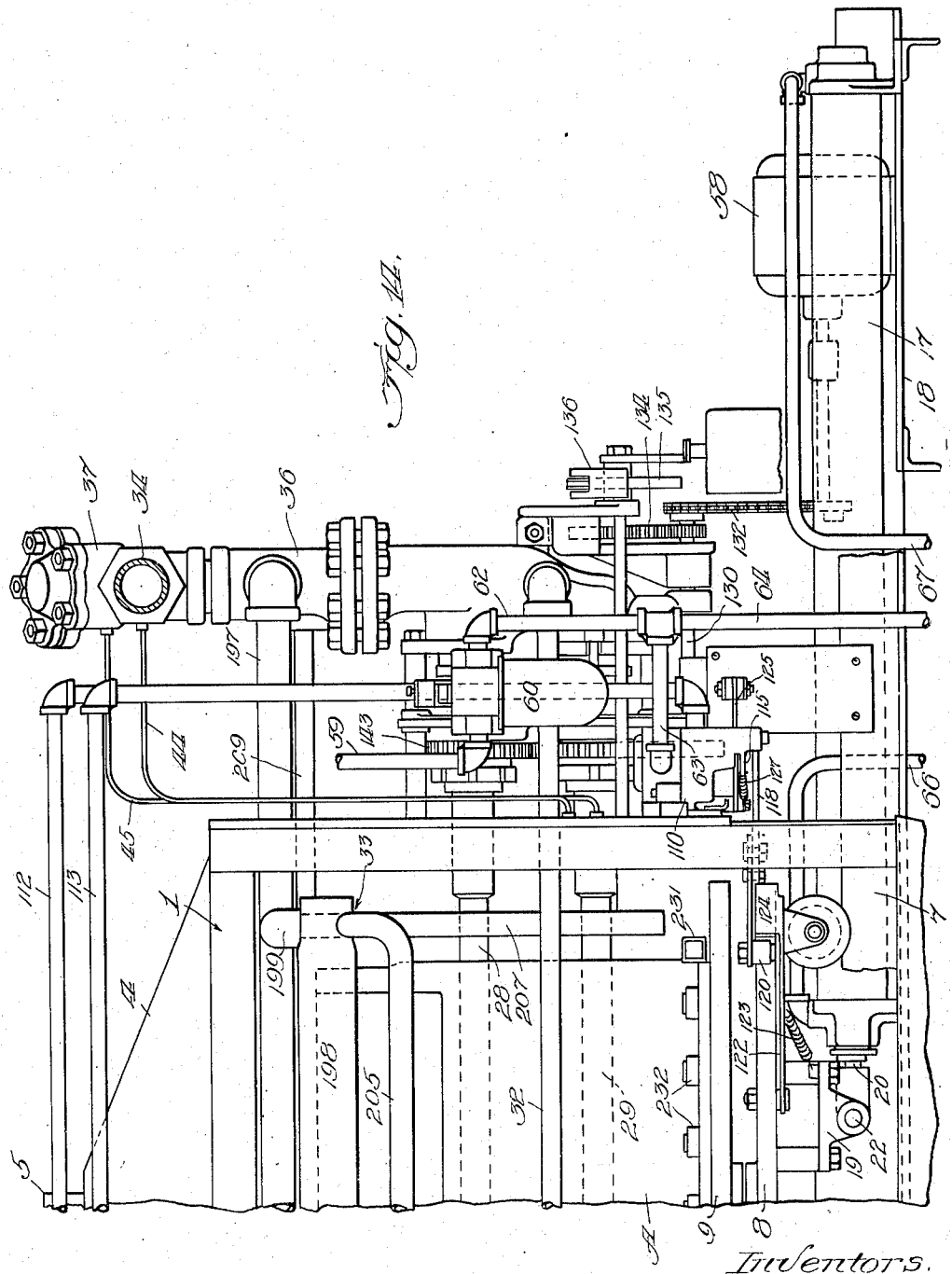

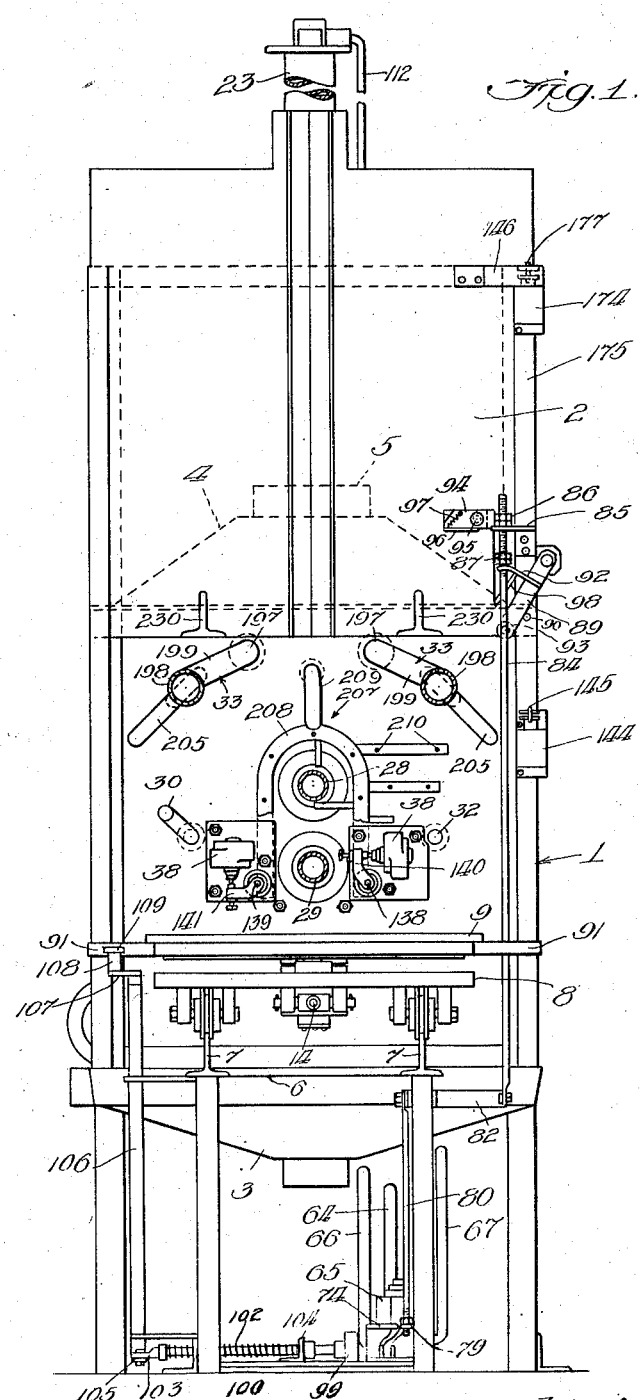

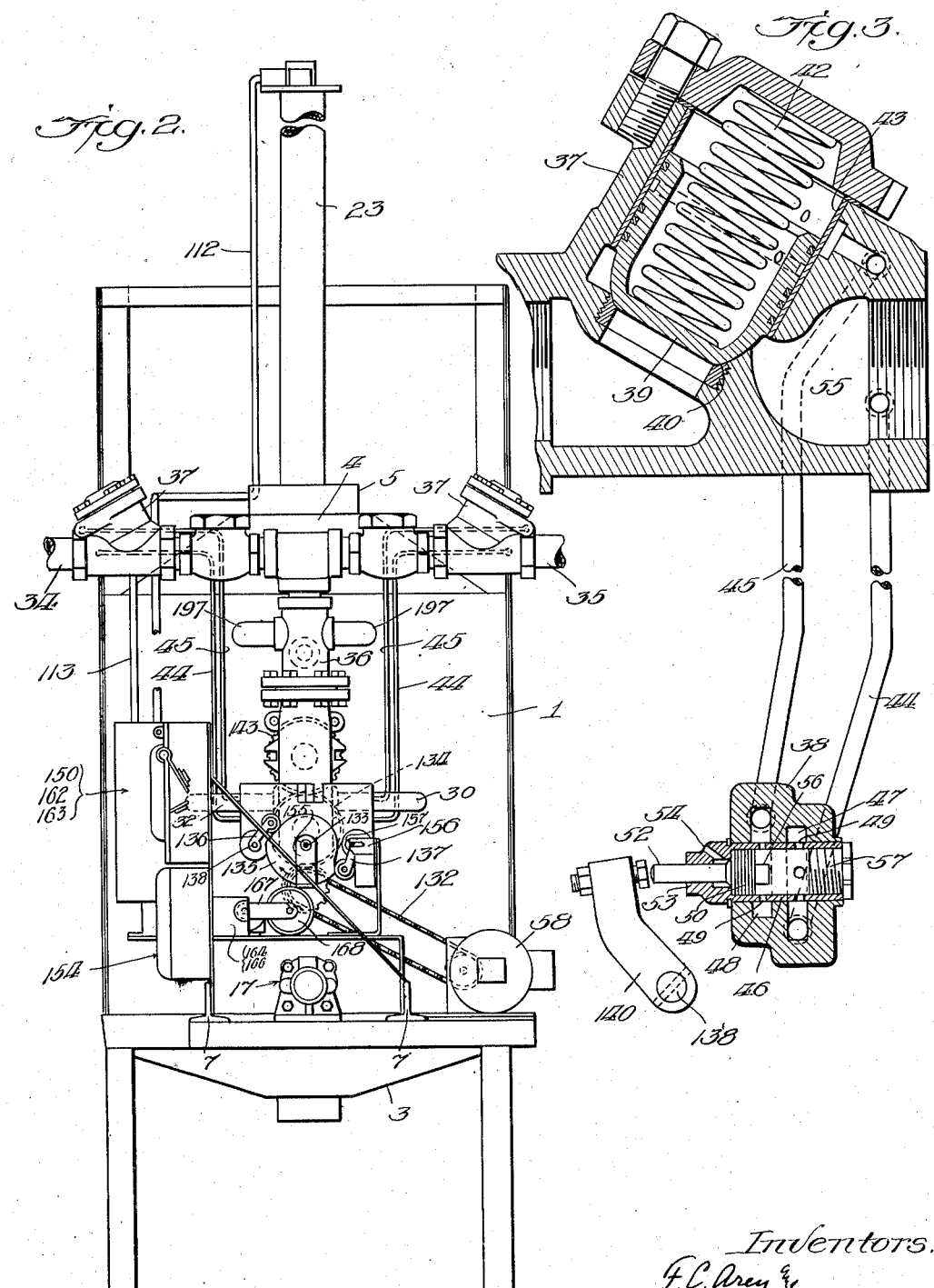

Oct. 7, 1941.　　F. C. AREY ET AL　　2,258,562
AUTOMATIC MOTOR BLOCK CLEANER
Filed Jan. 7, 1938　　12 Sheets-Sheet 3
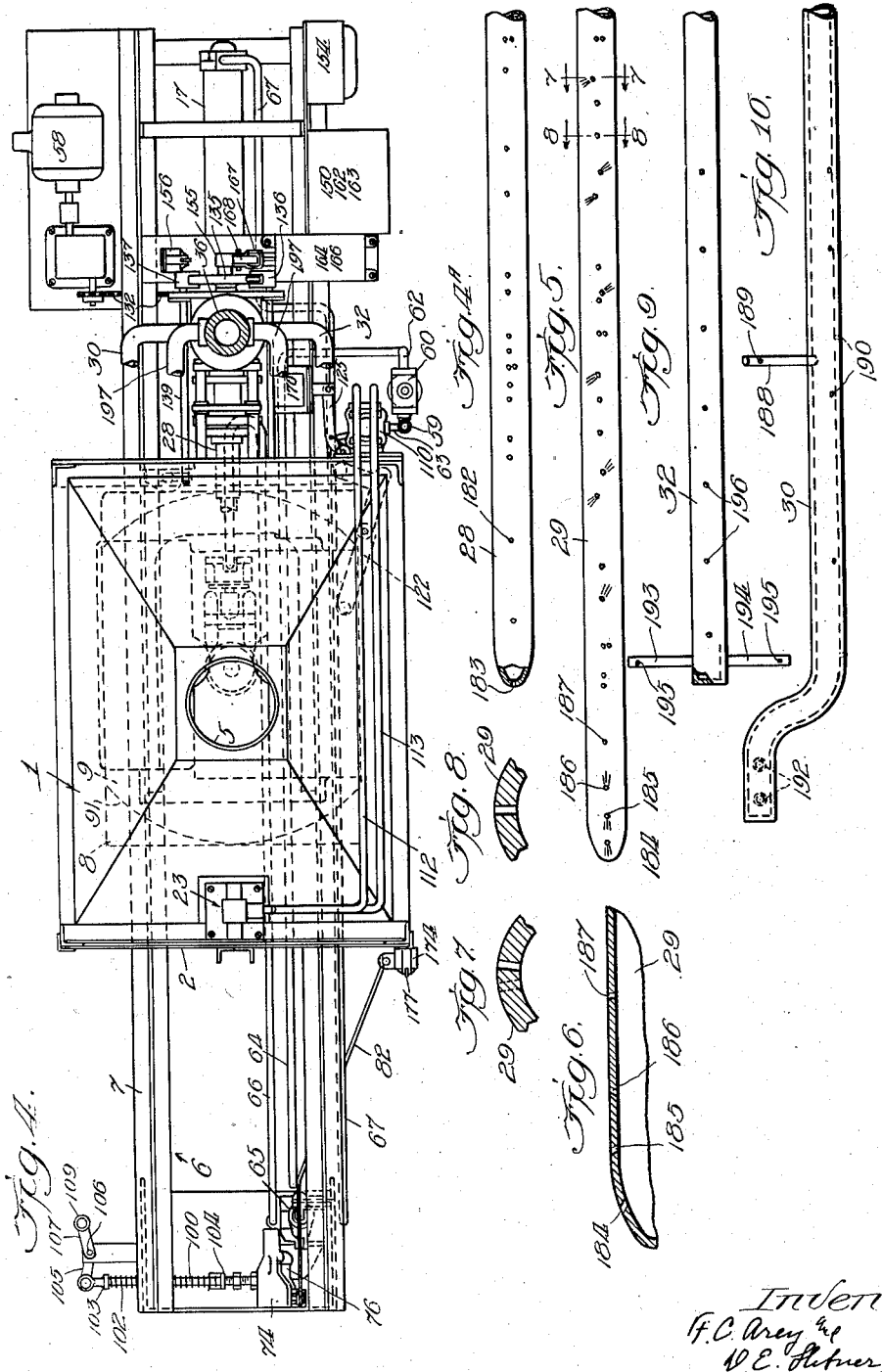

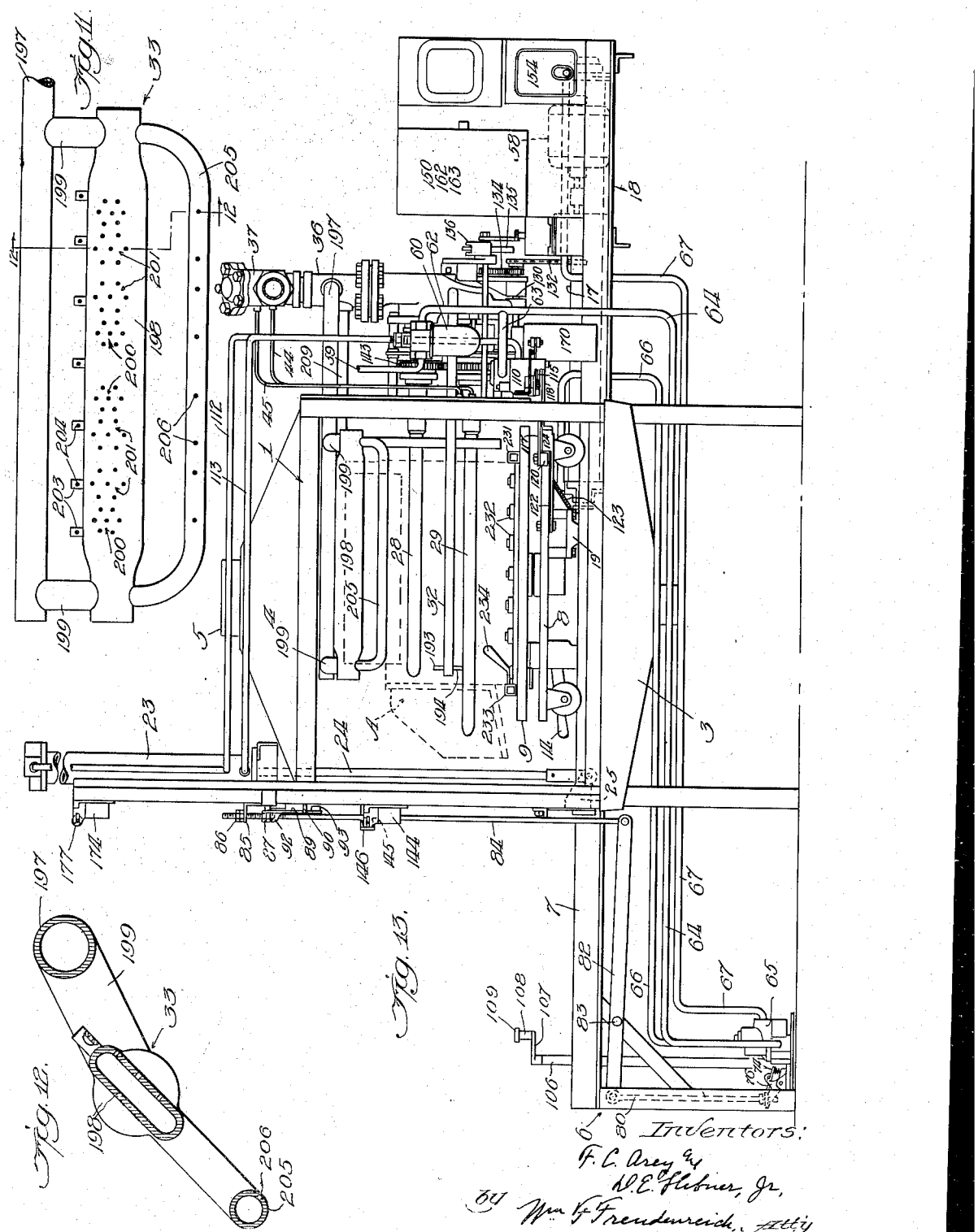

Oct. 7, 1941.　　F. C. AREY ET AL　　2,258,562
AUTOMATIC MOTOR BLOCK CLEANER
Filed Jan. 7, 1938　　12 Sheets-Sheet 5

Inventors.
F. C. Arey 2nd
N. E. Hibner, Jr.,
by Wm. F. Freudenreich, Atty

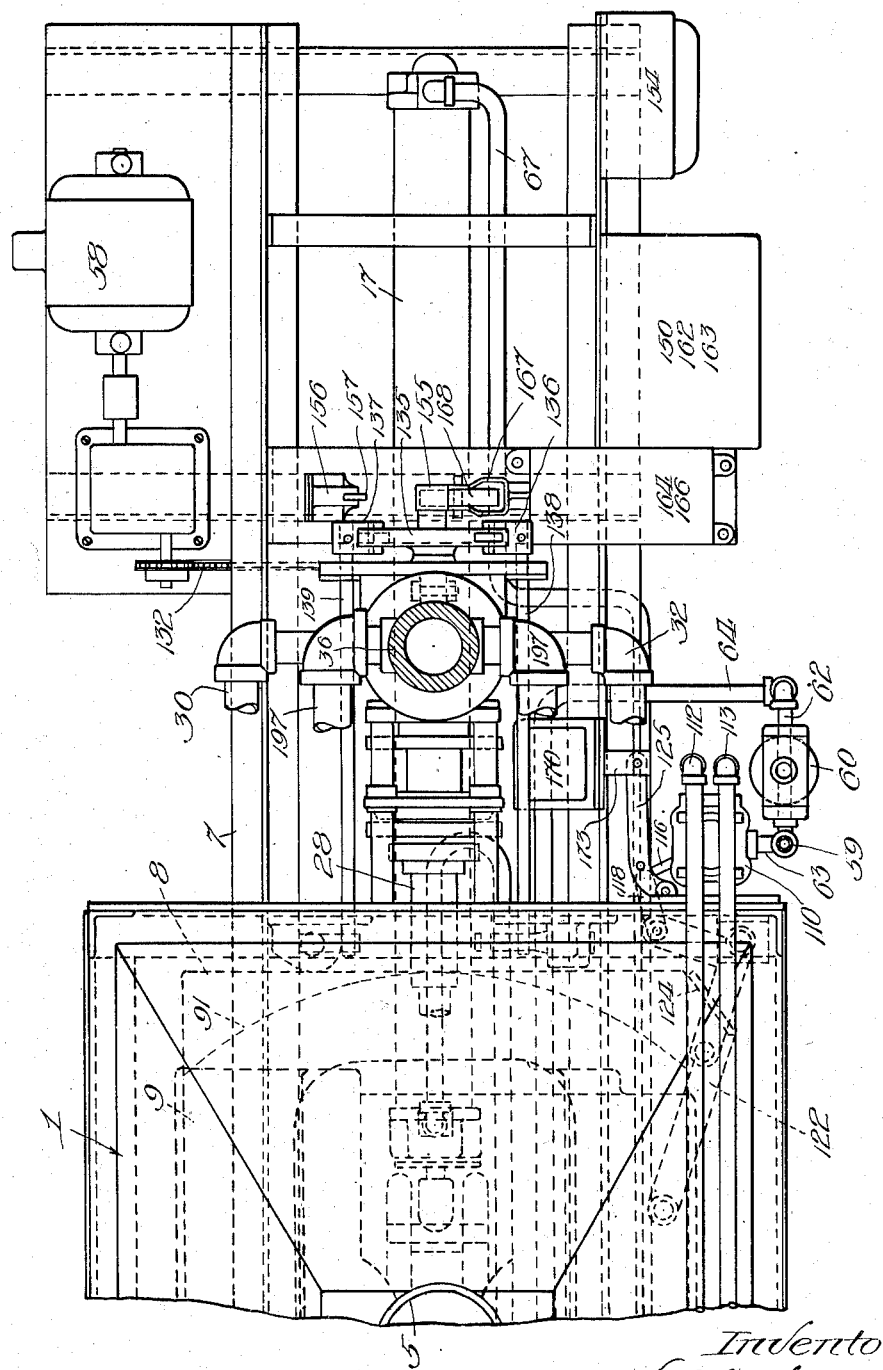

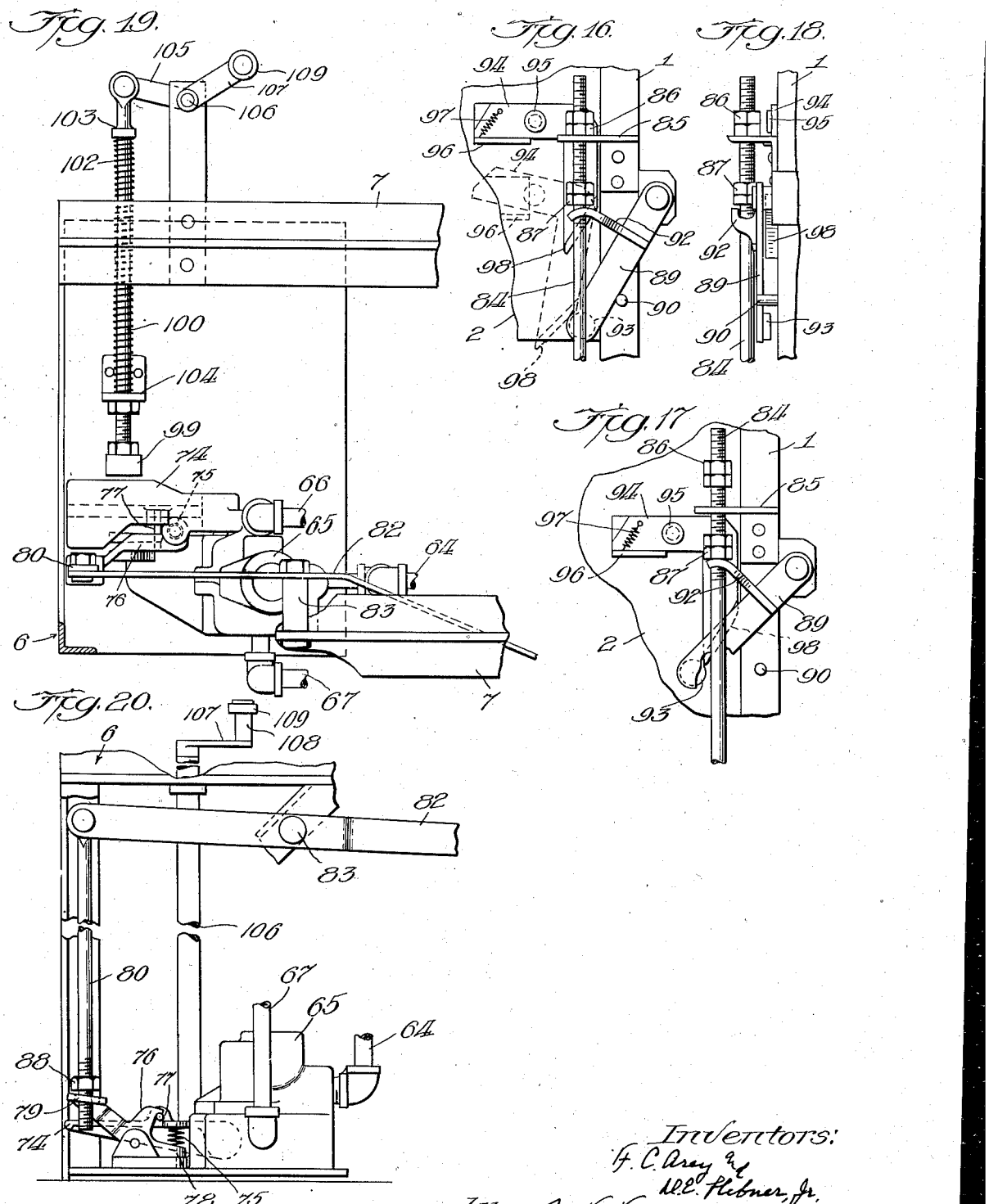

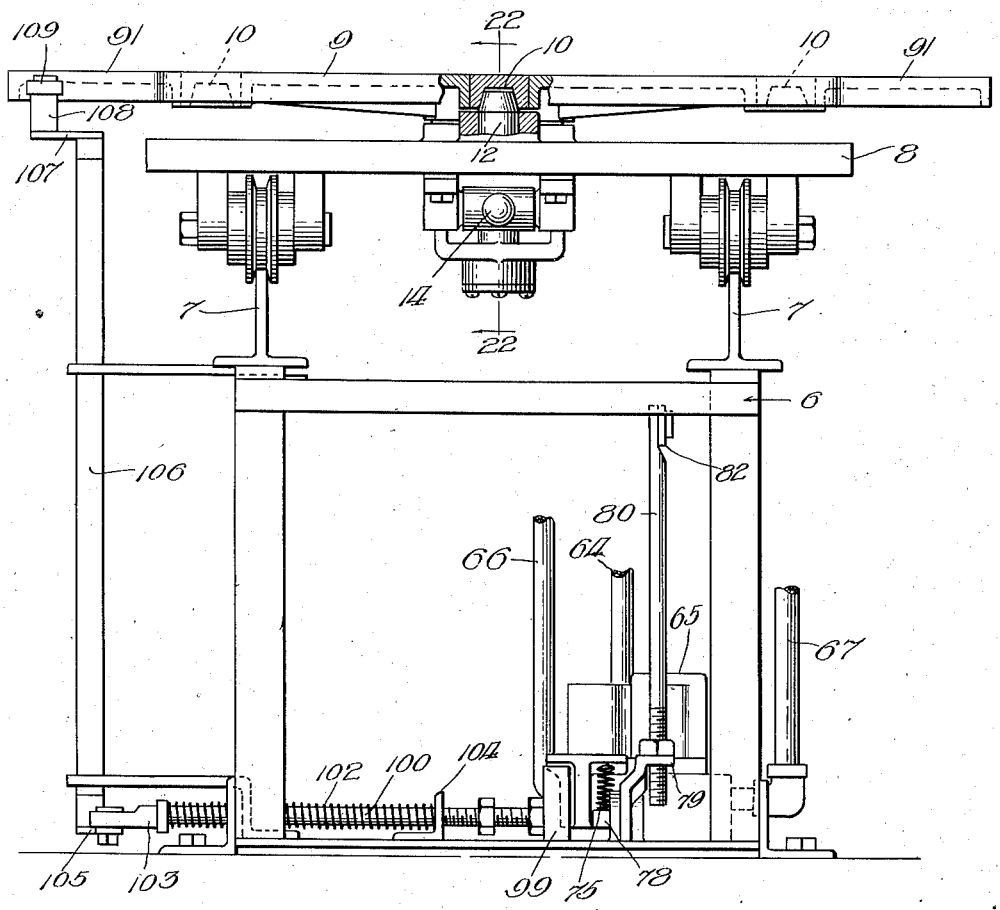
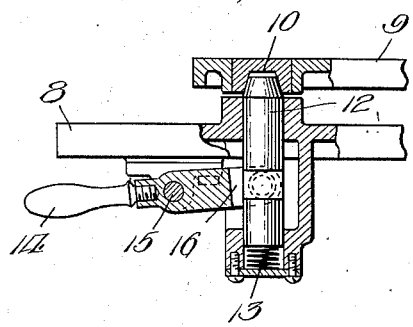

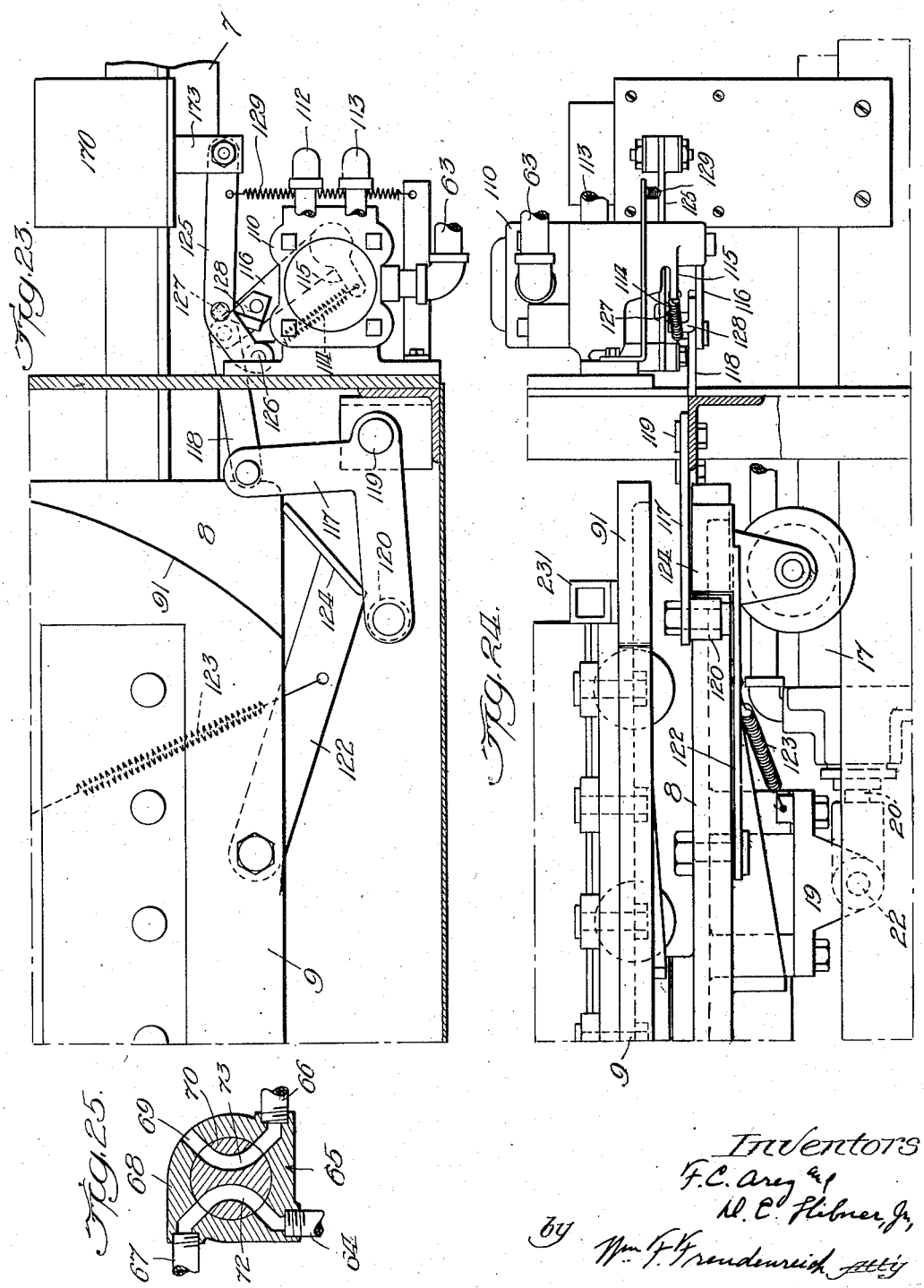

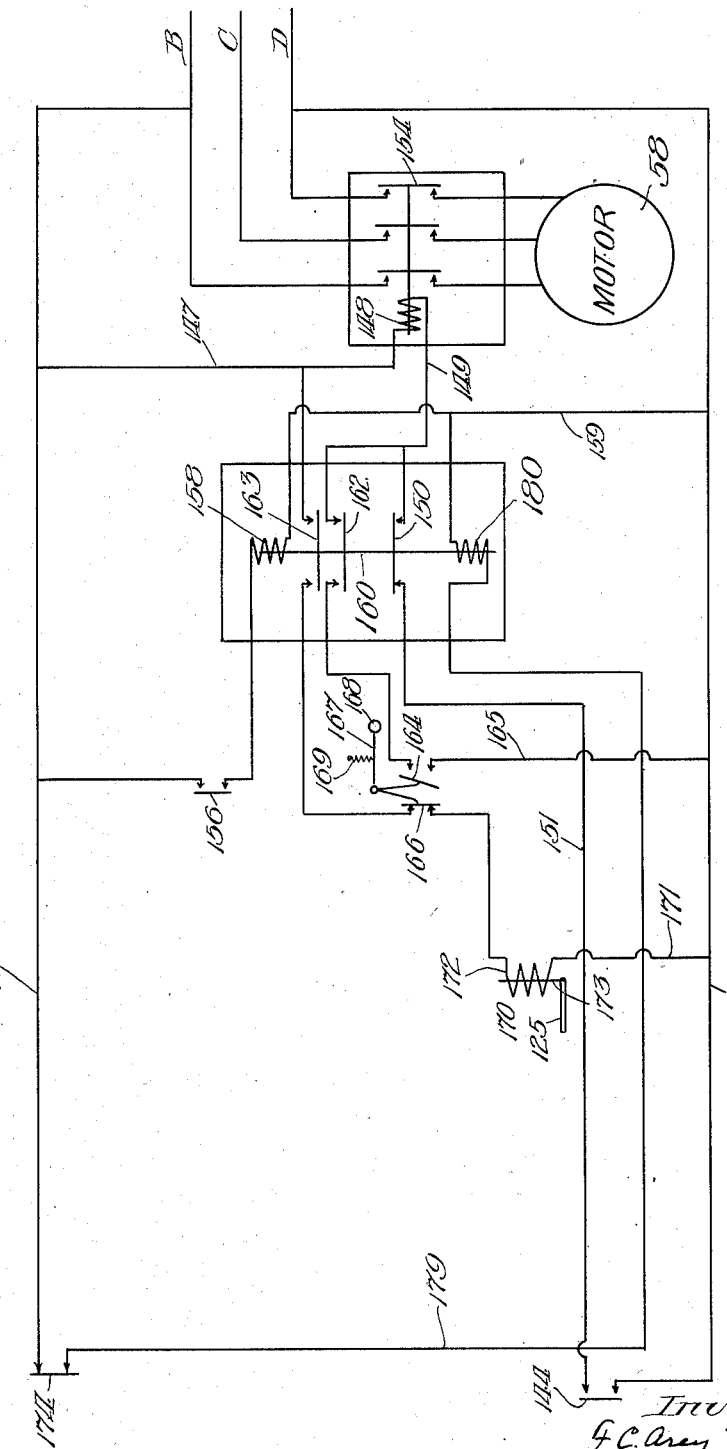

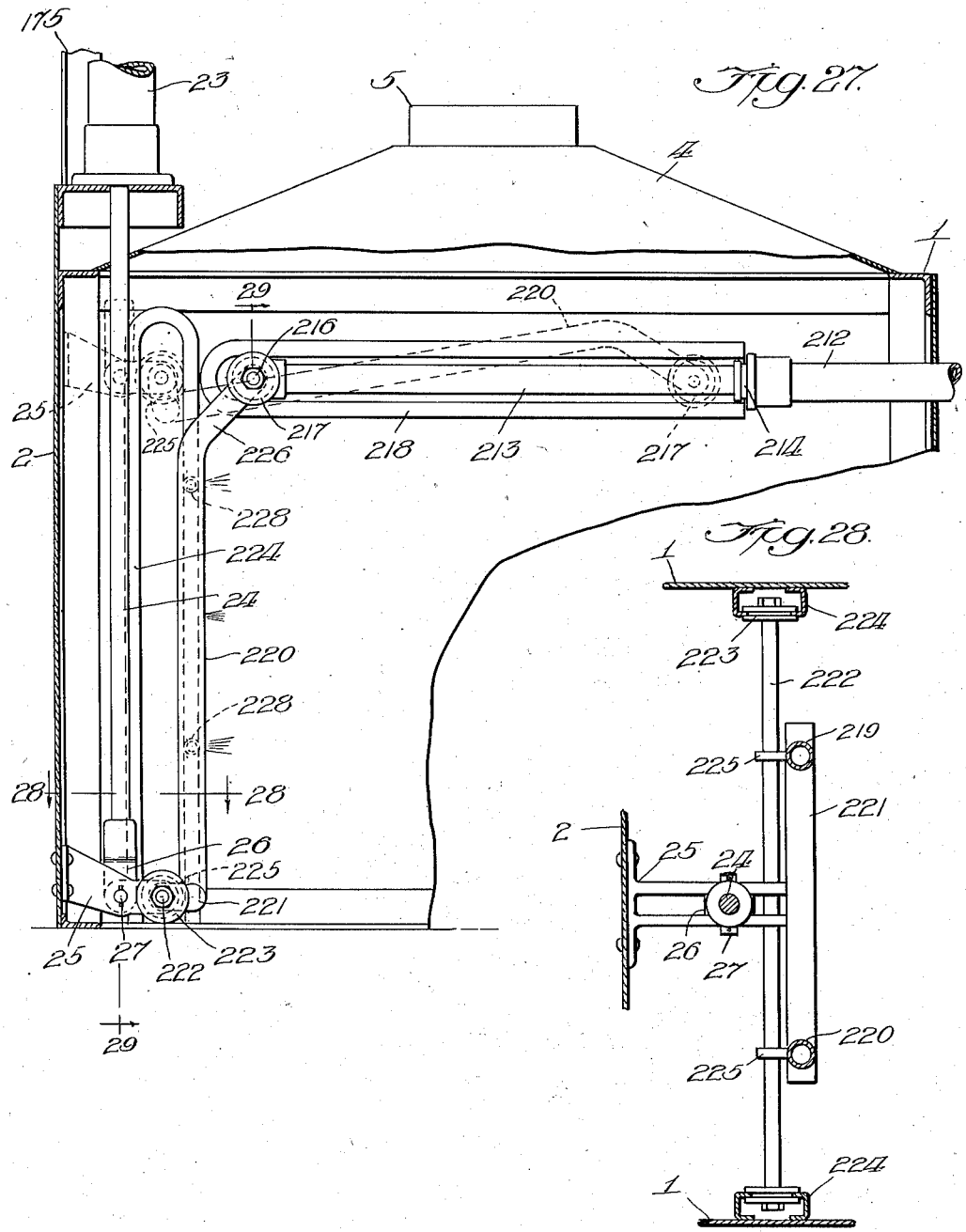

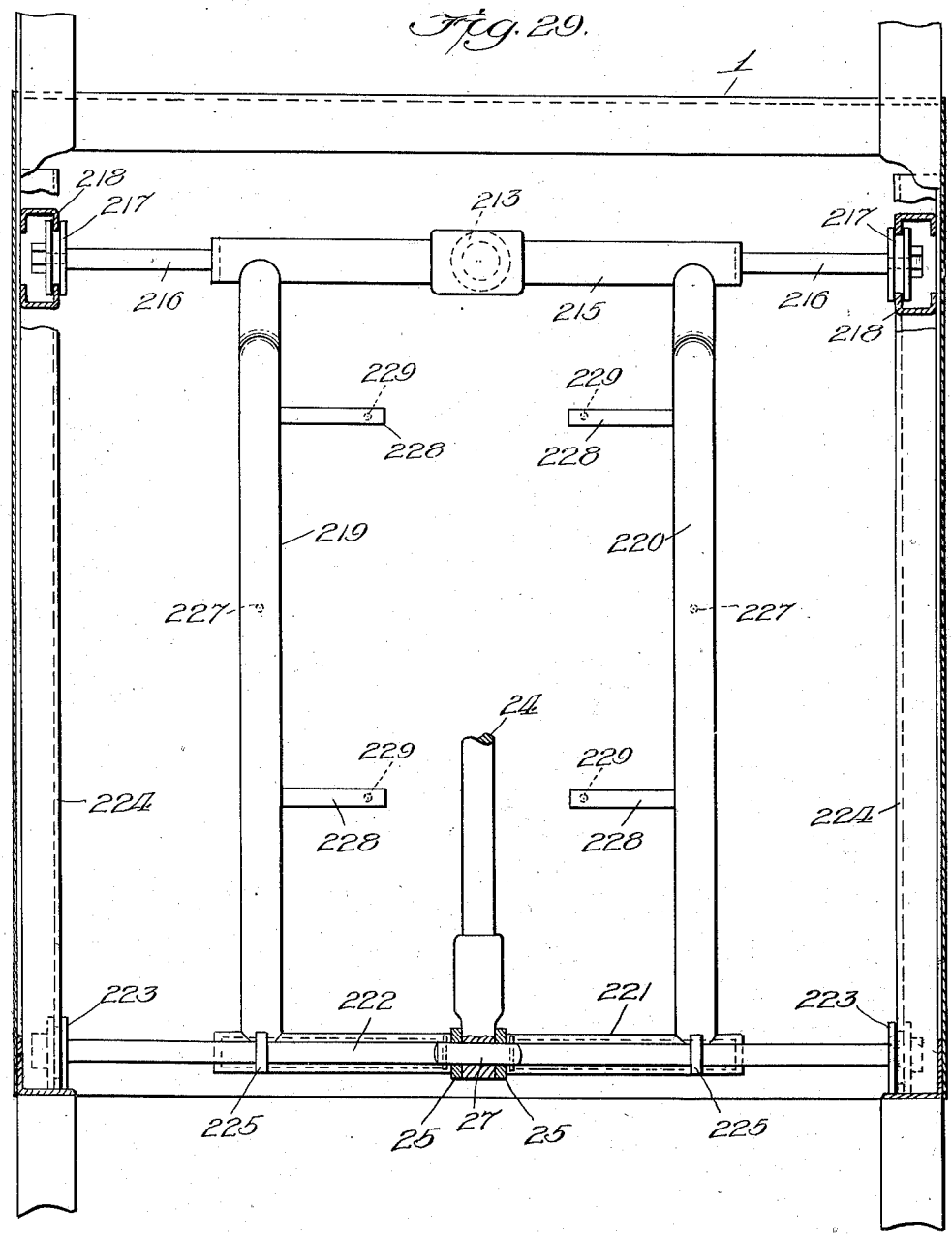

Patented Oct. 7, 1941

2,258,562

UNITED STATES PATENT OFFICE 2,258,562

AUTOMATIC MOTOR BLOCK CLEANER

Fred C. Arey, Oak Park, Ill., and De Los E. Hibner, Jr., Du Bois, Pa., assignors to Vulcan Soot Blower Corporation, a corporation of Pennsylvania Application January 7, 1938, Serial No. 183,760

11 Claims. (Cl. 141—1)

In our prior application, Serial No. 141,484, which has matured into Patent No. 2,216,698, dated October 1, 1940, there is disclosed an apparatus for cleaning the oil and metal chips from motor blocks. The present invention relates to apparatus of this same general type and has for its object to produce a simple, novel and efficient apparatus whereby a motor block or other piece of work to be cleaned may be started on its way into a cleaning chamber where it is automatically cleaned and, after cleaning, automatically removed from the chamber which is left in condition to receive another piece of work.

In carrying out our invention in one of its most highly developed forms, the cleaning is done in a housing having an opening and a door therefor. The door being open, the pressing of a hand lever or foot pedal causes a power-driven carriage on which is supported a motor block or other piece of work to be cleaned, to move into the housing through the doorway and come to rest in a cleaning position. The door then automatically closes and, thereafter, the cleaning devices are brought into play and operate through a predetermined cycle. At the end of the cycle of cleaning operations, the door is automatically opened and the carriage is automatically moved out of the housing through the doorway; the apparatus remaining in an idle position, with the door open, until what may be termed the master controller is again manipulated by the worker.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a front view of an apparatus embodying the present invention, the door of the housing being open; Fig. 2 is a rear view of the apparatus, the door being down or closed; Fig. 3 is a sectional view, on an enlarged scale, illustrating one of the main valves for controlling the supply of cleaning fluid, and a pilot valve therefor; Fig. 4 is a plan view, on a somewhat smaller scale than Figs. 1 and 2, of the apparatus, parts of the cleaning fluid supply system being omitted; Fig. 4A is an elevational view of one of the rotatable jetting elements; Fig. 5 is an elevational view of a second rotatable jetting element; Fig. 6 is a longitudinal section, on a larger scale, through the lefthand end of the jetting element of Fig. 5; Fig. 7 is a section on an enlarged scale, on line 7—7 of Fig. 5, showing only a fragment; Fig. 8 is a section on line 8—8 of Fig. 5, on the same scale as Fig. 7, illustrating another fragment; Figs. 9, 10, and 11 are, respectively, elevational views of three different stationary jetting elements; Fig. 12 is a section on line 12—12 of Fig. 11; Fig. 13 is a side elevation of the apparatus, as a whole, the side wall of the housing toward the observer being left off to expose the contents of the housing; Fig. 14 is a view similar to Fig. 13, but on a much larger scale, and showing only a fragment of the rear end of the apparatus; Fig. 15 is a view similar to Fig. 4, but on a larger scale, and illustrating only the rear half of the apparatus; Fig. 16 is a front elevation showing a fragment of the housing and parts of a door-operated tripping mechanism, one of the elements being shown in full lines in one position and in dotted lines in another position; Fig. 17 is a view similar to Fig. 16, illustrating the positions of the parts at the end of a tripping operation; Fig. 18 is an edge view of the parts illustrated in Fig. 16, in the same relative positions as they occupy in full lines in Fig. 16; Fig. 19 is a top plan view of the receiving station at the front end of the machine; Fig. 20 is a side view of the parts shown in Fig. 19; Fig. 21 is a front elevation of the receiving station, with the work carrying truck or carriage in position thereon; Fig. 22 is a view partly in elevation and partly in section, the section being on line 22 of Fig. 21; Fig. 23 is a view, partly in plan and partly in horizontal section, showing a rear corner of the housing and the valve mechanism for opening and closing the door; Fig. 24 is a view, partly in side elevation and partly in vertical section, showing approximately those portions of the apparatus that appear in Fig. 23; Fig. 25 is a diagram illustrating the valve of Figs. 23 and 24; Fig. 26 is a wiring diagram; Fig. 27 is a vertical section through the housing, from front to rear, illustrating jetting devices adapted to be interposed between the work and the door through which the work enters the housing; Fig. 28 is a section on line 28—28 of Fig. 27, but on a somewhat larger scale; and Fig. 29 is a section taken approximately on line 29—29 of Fig. 27.

In the drawings the invention is illustrated as embodied in an apparatus for cleaning a cylinder block for a V type engine and, for the sake of brevity, the detailed description will be confined to this particular embodiment; the only change required to adapt the apparatus to other types of engine blocks being a rearrangement of the jetting pipes or elements.

The apparatus contains a casing or housing 1, the front side of which is open and is provided with a vertically sliding door 2. The bottom 3 of the housing is inclined downwardly from the sides toward the center, to facilitate drainage, and the top 4 slopes upwardly from the sides toward the center, where it is provided with a flue or pipe 5 to carry away gases and vapors.

In front of the open side of the housing is a platform or receiving station 6 upon which are horizontal, parallel rails 7 that run across the same and into the housing through the extreme lower portion of the doorway. Running on these rails is a suitable wheeled truck 8 upon which is located a turntable 9 suitably equipped securely to hold a motor block such as indicated at A in Fig. 13, upon the same. Means are provided to lock the turntable upon the wheeled truck or carriage in any one of four positions spaced ninety degrees apart from each other. This permits a cylinder block to approach the receiving station from one side, head on; the turntable being then turned through an angle of ninety degrees to permit the block to enter the housing head on; and, upon leaving the housing, the turntable may be turned through another quarter turn and permit the block to move away from the receiving station from the side opposite that at which it entered, but still traveling head on. In the arrangement shown, as will best be seen in Figs. 21 and 22, the turntable has in the under side thereof four sockets 10 distributed ninety degrees apart, around the axis of the table. The carriage or truck bed is provided with a vertically movable pin 12 which is adapted to enter any one of the sockets 10, depending upon the angular position of the turntable. The sockets and the upper end of the pin 12 are preferably frusto-conical, to facilitate entry of the pin into the sockets. Below the pin is a spring 13 that tends constantly to hold the pin in its locking position. The turntable may be unlocked by raising the handle end of a lever 14, pivotally supported on the under side of the bed of the truck or carriage, as at 15, and having a fork 16 straddling and pinned to the pin 12.

The truck or carriage is adapted to be moved into and out of the housing by power. In the arrangement shown, as can best be seen in Fig. 14, there is a long horizontal cylinder 17 supported upon a platform 18 on the rear side of the housing and extending at its front end into the housing below the bevel of the bed of the truck. The truck has a bracket 19 on the under side, and the forward end of the piston rod 20, extending out through the front end of the cylinder 17, is connected to this bracket by a cross pin 22. When fluid under pressure is admitted into the front end of the cylinder, the piston rod is forced back and the truck is drawn into the housing. Upon exhausting the front end of the cylinder and admitting fluid under pressure into the rear end, the truck will be forced forwardly and out of the housing.

The door 2 at the front of the housing is also operated by power; there being on top of the housing, at the center of the door, a long vertical cylinder 23. A piston rod 24 extends out of the bottom of this cylinder on the inner side of the door and is connected at its lower end to the lower end of the door. As best shown in Figs. 27 and 28, this connection comprises a bracket 25 fixed to the door, the bracket having two parallel arms between which a flattened part 26 on the lower end of the piston rod extends and is secured by a suitable pin 27. When fluid under pressure is admitted into the lower end of the cylinder 23, the door is raised and, when the lower end of the cylinder is exhausted and fluid under pressure is admitted into the top, the door is caused to move down and close.

Within the housing are elements which are so distributed and so fashioned that when cleaning fluid under pressure is admitted thereto, all of the surfaces, bores and passages to be cleaned are properly subjected to jets of cleaning fluids. Some of these elements are stationary pipes or conduits, while others are rotatable members. In the arrangement shown, there are two rotatable horizontal jetting elements 28 and 29 arranged one above the other in a vertical plane extending through the center of the housing from front to rear; there are also stationary jetting pipes 30 and 32 at a level between those of the rotatable elements 28 and 29; and, in the top of the housing, are two similar units 33, 33 symmetrically disposed. Further description of these jetting elements or devices, and also of devices for subjecting the front and rear ends of a motor block to jets of cleaning fluids will hereafter be given. It may here be said, however, that the cleaning fluid for all of these elements is supplied from a controlled source behind the housing and above the platform 18.

In the particular arrangement shown, as best seen in Figs. 2 and 14, there are two horizontal supply pipes 34 and 35 behind and at about the level of the top of the housing. These two pipes may supply two different cleaning fluids under pressure; the fluid which at any given time is being delivered from pipe or the other, flowing down into a vertical manifold 36 which is connected directly to all of the jetting devices.

It is desirable that all of the operations constituting a complete cleaning cycle be performed automatically and, therefore, the cleaning fluids should be turned on and off automatically. We have illustrated a construction that not only turns the fluid on and off, but permits one fluid to be delivered for a given time and then the other fluid to be delivered for a further period of time when it, also, is shut off. To this end there is located between each of the pipes 34 and 35 a power operated valve device 37 illustrated in detail in Fig. 3. Each valve 37 is controlled by a pilot valve 38. It will be seen that the valves proper 39, of the valve devices 37, are cup shaped and close, against pressure, upon a valve seat 40. A spring 42 acts in a direction to hold the valve 39 closed. The valve 39 is slidable in a cylindrical bore 43. The parts are so proportioned that a section of the cup shaped valve is exposed to pressure on the inlet side of the system beyond the inner end of the cylindrical bore 43, whereby the pressure of the system tends constantly to force the valve open against the resistance of the spring 42. However, normally the space in the cylinder 43, behind the valve 39, contains the same pressure as that of the inlet side of the system and, therefore, the valve remains closed. However, if the space in the cylinder, behind the valve 39, is connected to atmosphere, the fluid pressure tending to open the valve is sufficient to do so. The pressures on each main valve are controlled by the corresponding pilot valve. There are two pipes 44 and 45 leading from the main valve casing to each pilot valve casing. The pipe 44 communicates with the inlet side of the system and the pipe 45 communicates with the interior of the cylindrical bore 43 behind the piston valve 39, at times when the latter is closed. The pilot valve contains a bore within which is fixed a sleeve or bushing 46. Surrounding the sleeve or bushing are two annular passages 47 and 48 with which the pipes 44 and 45, respectively, communicate. The ends of the bushing are closed. The bushing has holes 49 extending through the same and communicating with both of the passages 47 and 48. In the bushing is a piston 50, from which a rod or stem 52 projects out through the closure 53 at one end of the bushing. There is a port 54 leading from atmosphere through the closure 53 into the interior of the bushing. When the piston 50 is in the position shown in Fig. 3, fluid under pressure in the chamber 55 on the inlet side of the main valve 37 may flow into the pipe 44, into the annular passage 47, through the ports 49, and the interior of the bushing, into the annular passage 48, and through the pipe 45 into the cylindrical bore 43 behind the main valve; the pipe 44 being connected at one end to the passage 47, and the pipe 45 communicating with the passage 48. When the piston 50 is moved toward the right until the projection 56 thereon strikes the plug 57 that closes the righthand end, the ports 49 leading to the passage 48 become positioned on the lefthand side of the piston and, therefore, air can escape from the cylindrical bore 43 through the pipe 45, the interior of the bushing 46 and the port 54. Thus, the pressure in the chamber 55 of the main valve casing becomes effective to force the valve off its seat.

It will be seen that whenever there is no pressure against the outer end of the piston rod or stem 52, the pressure behind the piston 50, communicated through the pipe 44, forces the piston toward the left, so that fluid under pressure again flows from the chamber 55, through the pilot valve, and into the cylindrical bore 43 behind the main valve and, with the assistance of the spring 42, forces the main valve shut. It is therefore only necessary to push inwardly upon the end of each piston rod or stem 52 at the proper times and for proper periods, in order to deliver first one kind of cleaning fluid and then the other, and to shut off the supply in each instance, after the proper amount has been delivered.

The pilot valves are operated through mechanism driven by an electric motor 58 which also serves to rotate the rotatable jetting elements 28 and 29.

The energization of the motor depends upon the closing of the door for the housing, and the closing of the door depends upon the positioning of a piece of work in the housing in proper relation to the jetting elements. The entire automatic cycle of operations is set in motion by a workman at the receiving station operating the control valve for the power actuator for the truck or carriage. This actuator, as well as that for the door, utilizes compressed air. As seen in Figs. 13 and 14, compressed air is supplied through a pipe 59 and, after passing through an oiling chamber 60, it is discharged through a pipe 62 which ends in two branches 63 and 64. The pipe 64 extends down and then forwardly under the housing to a valve device 65 below and at the front end of the receiving station. From the valve device 65 extend two pipes 66 and 67, the first of which leads to the front end and the other of which extends to the rear of the cylinder 17. All that the valve 65 is required to do is alternately to connect the pipe 64 with the pipe 66 and with the pipe 67; connecting each of the pipes 66 and 67 to atmosphere, at the time of connecting the other with the pipe 64. In other words, the valve 65 first causes one end of the cylinder 17 to exhaust while air under pressure is entering the other end, and then reverses the process. This valve is illustrated diagrammatically in Fig. 25. In this diagram the valve casing 68 has an exhaust port 69 and suitable ports leading to the pipes 64, 66 and 67. The movable member of the valve is represented as a plug 70 containing separate passages 72 and 73. When the plug is in one of its two positions, that shown, the pipe 66 is open to atmosphere while the pipe 67 is receiving air from the pipe 64. Upon turning the plug in the clockwise direction through an angle of about ninety degrees, the pipe 67 becomes connected to the exhaust port and the pipe 66 to the supply pipe 64.

The valve 65 is shown a being adapted to be operated through a foot pedal 74, as best shown in Figs. 19, 20 and 21. Under the foot pedal is a compression spring 75 that tends normally to hold it up, with the valve in position to admit air into the rear end of the cylinder 17. In other words, during the normal idle condition of the apparatus, when it is ready for use, there is air in the rear end of the cylinder 17 and the truck or carriage for the motor block is held in its forward position, at the receiving station and outside of the housing.

Thus, normally the valve 65 is in the condition illustrated in Fig. 25, supply pipe 64 and the pipe 67 being connected together. When the workman presses down on the foot pedal, the valve is shifted into its second position, causing the rear end of the cylinder 17 to be exhausted through port 69 and air to enter the front end of the cylinder through pipe 66; the truck or carriage moving into the housing as the piston in the cylinder 17 is forced rearwardly. After the pedal 74 has been pressed down, it is held in that position by a pivoted catch 76 mounted on a stationary part of the apparatus beside the foot pedal. As best seen in Fig. 20, the pedal has a laterally projecting pin 77 over which the catch is adapted to hook when the pedal is down. The catch has a forwardly projecting foot 78 on which the spring 75 may conveniently rest; so that this spring serves both yieldingly to hold the catch in its locking position and to swing the foot pedal up, upon release of the catch. The catch also has an arm projecting forwardly and provided with a laterally extending flange 79 through which a vertical tripping rod 80 extends loosely.

The tripping rod 80 is controlled by the door of the housing. As shown in Fig. 13, the rod 80 is hung from the forward end of a more or less horizontal lever 82 pivoted to the framework of the apparatus toward its front end, as indicated at 83. Connected to the rear end of the lever 82 is a vertical rod 84 that extends up in front of the door opening toward one side of the housing. At its upper end the rod 84 passes freely through a bracket 85 fixed to the housing. The rod 84 has thereon separated nuts 86 and 87, each with its lock nut, one located above the bracket 85 and the other below. These nuts are spaced apart far enough to permit the rod 84 to be raised to a point where a nut 88 on the lower end of the tripping rod 80 comes down upon the flange or arm 79 of the catch 76 and forces the catch into its release position, so as to allow the foot pedal to rise automatically and shift the valve 65; and to permit the rod 84 to drop down for enough to cause the tripping rod 80 to be lifted into an idle position and leave the catch free to lock the foot pedal down upon pressing the latter down.

The operation of the rod 80 to trip the catch is one that is practically instantaneous and occurs once during a complete door-opening and closing cycle. The means for bringing this about are best disclosed in Figs. 16, 17 and 18. Just below the bracket 85 is hung an arm 89 which normally stands in an inclined position, as indicated in Fig. 16, with its under edge resting against a stop pin 90 and its free end overlapping the housing door. This arm has thereon a laterally projecting fork 92 that embraces the rod 84 just below the nut 87. On the extreme lower end of the arm is a roller 93. On the door, near the lower end of the latter, is mounted an L-shaped dog 94 having a short horizontal arm and a depending long vertical arm. This dog is pivoted to the door by a pin 95 at about the middle of its short arm. The free end of the short arm of the dog normally rests on a ledge 96 fixed to and projecting forwardly or outwardly from the door. A small tension spring 97, attached at one end to the ledge 96 and at the other end to the dog 94, tends yieldingly to hold the short arm of the dog on the ledge, but permits the dog to swing in the clockwise direction, as viewed in Figs. 16 and 17. On the lower free end of the long arm of the dog 94 is a forwardly or outwardly directed flange 98 which extends diagonally of the arm. The parts are so proportioned that when the dog 94 is in its normal position, as shown in full lines in Fig. 16, with the door either up or down, the flange 98 lies in a vertical line containing the axis of the roller 93. Therefore, when the door is opened by raising the same, the flange 98 engages with the roller 93 and forces it toward the left, as viewed in Fig. 17, thus swinging the arm 89 in the clockwise direction and causing the fork 92 to press upwardly against the nut 87 and thus lift the rod 84. In Fig. 17 the door is almost at the top of its movement and the flange 98 is just about to rise above the top of the roller 93 and thus permit the arm 89 to drop back into the normal position indicated in Fig. 16. Of course, as soon as the roller 93 is released from the flange 98, the rod drops back into its normal position with the nut 96 resting on the bracket 85. When the door again moves down, in closing, the lower side or face of the flange 98 engages with the top of the roller 93, as indicated in dotted lines in Fig. 16, causing the dog 94 to be swung in the clockwise direction and the flange to be carried clear of the roller during the continued downward movement of the door. Thus, the door, in closing, does not in any way affect the latch for the valve 65 and this latch remains in its latching position, regardless of where the foot pedal is, except for an instant as the door is almost at its fully open position, during the opening movement of the door.

It is desirable that the apparatus be prevented from operating except when the turntable is in the proper position to enter the housing with a cylinder block facing the housing head on. We have therefore provided means whereby, when the truck or carriage 8 is at the receiving station, the turntable 9 exerts a control over the valve 65. It will be seen that the turntable is longer than it is wide and that, as shown in Fig. 1, it cannot pass through the doorway of the housing when it is presented broadside thereto. The ends of the turntable are rounded, as indicated at 91, on arcs of circles concentric with the axis of the turntable. When the turntable is crosswise of the truck or carriage, as shown in Figs. 1 and 21, and the truck or carriage is at the receiving station, one of the rounded ends coacts with a device for locking the foot pedal 74 in its raised position. This device is best shown in Figs. 19 and 21, consisting of a block 99 on the inner end of a transverse rod 100 slidably mounted in the base of the apparatus and projecting beyond one side of the latter. A spring 102 surrounding this rod and bearing at one end against a nut 103 and at the other end against a stationary bearing plate 104, through which the rod passes, tends normally to hold the rod in a position that carries the block 99 from under the foot pedal and thus permits the workman to press the foot pedal down. The outer end of the rod 100 is connected to the free end of an arm 105 on a vertical rock shaft 106 which has at its upper end a radial arm 107 from the outer end of which rises a short post 108 having at the upper end a roller 109 that is in the plane of the turntable. The parts are so proportioned that when the turntable is at the receiving station and is in the position to receive a cylinder block from a conveyer or the like or to deliver it to a conveyer or assembly line, one of the rounded ends 91 presses against the roller 109 and holds the rock shaft 106 in such angular position that the block 99 underlies the foot pedal, as shown in Fig. 21. Therefore, when a cylinder block is received by the turntable, the workman must turn the turntable around so as to present the block head on to the doorway in the housing. This turning of the turntable brings the roller 109 opposite the narrow width of the latter and thus the spring 102 is permitted to shift the rod 100 and locking block 99 into their release positions; at the same time rocking the shaft 106 so that when the carriage with the cylinder block thereon is returned from the housing and the turntable is rotated through an angle of ninety degrees to present the cylinder block head on to the receiving conveyer or assembly line, one of the rounded ends of the turntable again forces the locking block 99 under the foot pedal.

It will thus be seen that after a cylinder block has been received by the turntable, and the latter has been turned through an angle of ninety degrees so as to permit it to enter through the doorway of the housing, the workman need only press his foot down on the pedal 74 to cause the motor block to be moved into the housing. The workman need not keep his foot on the pedal because, the door being open, the catch for the pedal is in its locking position and therefore automatically engages the pin 77 on the foot pedal when the latter is pressed down. The next step in the cycle of operations is the closing of the door and this will now be described.

The admission of air to and the exhaustion of air from the door-operating cylinder 23 is controlled by a valve 110 which is substantially identical with the valve 65 and may therefore be represented equally well by the diagrammatic illustration in Fig. 25. As best seen in Figs. 13, 14, 23 and 24, the branch air pipe 63 is connected to the casing of the valve 110, so that it supplies air to this valve in the same way that the branch pipe 64 supplies air to the valve 65. Two pipes 112 and 113 extend from the valve 110 to the upper and lower ends, respectively, of the door-operating cylinder 23. It is sufficient to say that the valve 110, like the valve 65, has two positions, in one of which air under pressure entering the lower end of the cylinder 23 through pipe 113 holds the door up while, in the other position, air entering the upper end of the cylinder 23 through the pipe 112 holds the door closed. What may be termed the normal position of the valve 110 is that which causes the door to be held open. A spring 114, acting on an arm 115, connected to the movable member of the valve, tends constantly to keep the valve in the position which causes the door to remain up. Therefore, in order to close the door of the housing, it is necessary to operate the valve 110 so as to shift it into the second of its positions. This is accomplished through the action of the truck or carriage as the latter nears the limit of its movement upon entering the housing. In the arrangement shown, the valve lever, proper, 116, is connected to the free end of one arm of a bellcrank lever 117, arranged within the housing, by a link 118. This bellcrank lever lies in a horizontal plane at about the level of the bed of the truck or carriage and is capable of swinging in that plane about a vertical pivot pin 119 in the form of a bolt that fastens it to the housing. On the free end of the second arm of the bellcrank lever is a roller 120. Pivoted to the bed of the truck, on the side toward the bellcrank lever, is an arm 122 capable of swinging in a horizontal plane and normally held at one limit of its swinging movements by a tension spring 123. On the free end of the arm 122 is an upwardly directed flange 124 of considerably greater length than the width of the arm. The parts are so proportioned that as the turntable moves into and out of its position of rest in the housing, the flange 124 engages with the roller 120; either to push the roller sidewise or to be pushed sidewise by the roller. In the normal position of the valve 110, the roller 120 lies close to the vertical plane of the edge of the bed of the truck or carriage, so that as the truck or carriage approaches the rear end of the housing, the outer vertical face of the inclined flange 124 engages with the inner side of the roller 120 and causes the roller to be pushed away from the truck or carriage and the bellcrank lever to be rocked. The truck or carriage is permitted to travel only a very short distance after the flange 124 has passed beyond the roller 120 so that unless other restraint be placed on the bellcrank lever or the valve 110, the valve returns to its normal position. However, just as there is a catch to hold the foot pedal 74 down, there is another catch provided to hold the valve 110 in its second position. This catch takes the form of a horizontal lever 125 pivoted at one end, as at 126, for swinging movements in a horizontal plane; the lever overlying and extending transverse to the valve lever 116 and having a pin 127 adapted to engage a lug 128 on the valve lever. A spring 129, acting on the lever 125, tends constantly to hold it in such a position that the pin 127 lies in the path of travel of the lug 128 as the valve 110 is shifted from one of its two positions to the other. Consequently, when the positioning of the carriage in the housing, operating through the bellcrank lever 117, moves the valve from its door-opening to its door-closing position, the catch, which comprises the lever 125 with its pin at 127, and spring 129, is ready to lock the valve in its new position. As a result, even though the actuating flange 124 passes slightly beyond the roller 120, after the valve has been shifted, the valve cannot return to its normal position until the catch is released. Upon release of the catch, the valve 110, of course, returns to its normal position and admits air into the lower end of the cylinder 23 so as to cause the door to be opened again. Consequently, the cleaning of the work must be accomplished before this catch is released. However, the cleaning operation should not begin until the door has been closed, following the introduction of a cylinder block into the housing.

The cleaning operations comprise subjecting the motor block to the action of jets of one or more fluids and the rotation of two tubular jetting elements. In the particular arrangement shown, the delivery of two different fluids under pressure depends upon the operation of the two pilot valves, and this is accomplished by energy supplied by the electric motor 58 mounted on the platform 18, which motor also rotates the rotatable jetting elements and operates certain switches, as will hereinafter be described.

The motor drives a shaft 130 through a sprocket chain 132, or otherwise, which shaft, in turn, drives a cam shaft 133 positioned above the same, by means of suitable gearing 134. On the rear end of the cam shaft is a cam 135 comprising two arc-shaped segments of different radii. Engaging with the periphery of the cam, as best shown in Figs. 2 and 15, are two rollers on two rocker arms 136 and 137. These rocker arms are fixed on the ends of shafts 138 and 139, respectively, lying on opposite sides of and parallel to the cam shaft. The forward ends of these rock shafts 138 and 139, extend through the rear wall and, on the inside housing, are provided with radial arms 140 and 141, respectively. Each of the rocker arms 140 and 141 is adapted to actuate one of the pilot valves 38, as best shown in Figs. 1 and 3.

The shaft 130 also drives the two rotatable jetting elements 28 and 29, through a suitable gear train 143. The parts are so proportioned that the jetting elements 28 and 29 make two revolutions while the cam shaft revolves only once. When the roller on one of the arms 136 or 137 is riding on the high portion of the cam, the other is on the low portion, so that the pilot valves can be opened, one at a time, only. In other words, when the motor is set in operation, one of the pilot valves is opened and fluid from the supply pipe 34 is admitted to the jetting elements and, after the rotatable jetting elements have been turned through a predetermined angular distance, the first pilot valve is closed and the other is opened; fluid being thereafter admitted to the jetting elements through the supply pipe 35. Means are provided to cause the motor to stop at a time when both pilot valves are closed.

Since the motor should not start until the housing door has been closed, we include in the controlling circuit for the motor a switch which is actuated by the door just as it is about to close. This switch is shown at 144 in Fig. 1, and is shown as being provided with a roller 145 that is adapted to be engaged by one arm of a Z plate 146 fastened to the outer side of the door near the top. When the door is just about to become fully closed, the member 146 presses on the roller 145 and actuates the switch.

Fig. 26 is an electric diagram of connections and there the switch 144 is shown as being normally open. Consequently, when the roller 145 moves inward, this switch is closed. A circuit may now be traced from one of the main line wires B, through wire 147, solenoid 148, wire 149, switch 150, wire 151, switch 144 and wire 153, back to the main line wire D; switch 150 being normally closed as will hereinafter be explained. Solenond 148 operates the main motor switch 154, so that the motor is energized upon the closing of the door.

After the motor has started, it continues to run until a cycle of jetting operations has been completed. Thereupon, the motor must stop, the door be opened again, and then the cylinder block be run out of the housing. The switch 144, controlled by the door, does not open until the door itself has been opened, and therefore, some other means must be provided to open the motor circuit. Accordingly, there is secured on the rear end of the cam shaft 133 a radial arm 155, as best shown in Figs. 2 and 15; and, mounted on a stationary support in the same transverse plane as the arm 155, is a switch 156 provided with a lever or the like ending in a roller 157 which projects out far enough to be engaged by the outer end face of the arm 155 at a predetermined point in the rotation of the cam shaft. The switch 156 is normally open as indicated in the diagram in Fig. 26, and is closed by the action of the arm 155. This closing of the switch 156 occurs after the cam shaft has completed the larger part of a revolution. From an inspection of the diagram, it will be seen that upon the closing of the switch 156, current flows from line wire B through the same, through the coil 158 of the solenoid and through wires 159 and 153 to line wire D. The core 160 of the solenoid 158 is connected to the movable element of the switch 150 and to the movable elements of a double switch 162 and 165. The energization of the solenoid 158 causes the switch 150 to open, and the switches 162 and 163 to close. The energizing circuit for the main switch 154 of the motor is now from line wire B, through wire 147, coil 148, wire 149, switch 162, a switch 164, which is in its closed position, through wire 165 and wire 153 to line wire D. Switch 164 is one member of a double switch whose other member is indicated at 166. Thus, the circuit for the motor switch is now independent of the switch 144 which is controlled by the door. The movable members of the switches 164 and 166 have a common operating arm or lever 167 arranged in the same plane as the arm 155 on the cam shaft. On the free end of the arm 167 is a roller 168 adapted to be engaged by the outer end of the arm 155. Normally, as indicated in the diagram, a spring 169 holds the arm 167 with its roller raised, so that the switch 164 is closed and the switch 166 is open. However, when the cam shaft is just about to complete a revolution, the arm 155 depresses the roller 168, so that the switches 164 and 166 are placed in the positions shown in the diagram and held in those positions because of the stopping of the motor. The motor stops because the switches 150, 162 and 163 remain in the positions which they occupied after the closing of the switch 156, even after that switch is again opened. Consequently, the opening of the switch 164 at the end of a revolution of the cam shaft causes the motor switch to be deenergized and open, because both of the energizing circuits for the main switch coil 148 are now open, one at the switch 150 and the other at the switch 164.

When the motor stops, it is time to open the door of the housing to permit the removal of the cylinder block which has been cleaned. This is accomplished by releasing the catch that locks the valve 110 in the door-closing position and permitting it automatically to return to its normal position which allows air to flow into the lower end of the door cylinder 23 and thus raise the door to open the same. The release of the catch is effected by an electro-magnetic device 170 which, as illustrated in the diagram, may comprise a coil 172 and a core member 173 moved in one direction upon the energization of the coil. The circuit for energizing the coil 172 is from line wire B through wire 147, switch 163, switch 166, coil 172, wire 171 and wire 153 to line wire D. The core member is connected to the free end of the catch lever 125, and the parts are so designed that upon the energization of the electro-magnetic coil, the catch lever is drawn back into its release position against the resistance of the spring 129. Consequently, the valve lever 116 is released and the spring 114 throws the valve 110 into its door-opening position.

The carriage should begin to move outwardly through the door-opening as soon as the door is out of the way. It will be recalled that as the door travels up it trips the catch for the foot pedal which, during all this time, has been in its depressed position, causing the carriage to be held in its most rearward position because of the air under pressure in the front end of the cylinder 17. As soon as this catch is released, the front end of cylinder 17 is opened to atmosphere and air under pressure is admitted to the rear end; so that the carriage is forced out of the housing through the door opening and is held in its outward position by the pressure in the cylinder. Upon removal of the cylinder block from the carriage and its replacement by another block to be cleaned, the cycle of procedures and operations that have been described may be repeated.

Since the motor cannot start again until the door is closed, at which time the circuit for the motor switch actuator can be completed only through the switch 150, means are provided to close this switch and open the switches 162 and 163 after the motor has stopped. To this end there is provided a second door-controlled switch 174; this switch being placed at the top of a frame 175 rising above the housing proper and serving as a guide structure for the door. When the door is in its upper position, the member 146 engages with a roller 177 on or associated with the switch actuator, and moves the switch into the position opposite that which it occupies when the door is closed or partially closed.

In the diagram the switch 174 is illustrated as being closed when the door is up. It will thus be seen that current may now flow from line wire B through wire 178, switch 174, wire 179, solenoid coil 180 and wire 159 to line wire D. In this way the coil 180 is energized and, the opposing coil 158 being deenergized because the switch 156 is open, the switches 150, 162 and 163 are shifted into the positions which they occupy in the diagram. The system is now ready to cause the motor to start whenever the door is again closed and closes the switch 144.

The jetting elements are all provided with nozzles or orifices adapted to discharge jets at such points and in such directions that oil and chips present in the various passages and bores of the cylinder block are removed from the block; some of the jets driving oil and chips into the space below and into which the cylinder bores open, and into the cam shaft space; and the jets discharged by the two rotatable jetting elements serving to clean the surfaces surrounding said spaces and to blow the accumulation of oil and chips out through one end of the block.

The rotatable jetting element 28, as shown in Fig. 4A, has a row of radial orifices 182 distributed lengthwise thereof, there being at some points two orifices, close together and in the same radial plane, to provide a more powerful jetting action at these points. There is also an orifice 183 in the free, closed end of the element to discharge a jet in the axial direction. This jetting element extends through the cam shaft space in the block.

The other rotatable jetting or blowing element 29, which extends through the space in the block below and into which the cylinder bores open, is shown in detail in Figs. 5 to 8. The element 29, like the element 28, is closed at its forward, free end and contains orifices distributed throughout the length thereof. Some of these orifices are drilled radially and others at an inclination to transverse planes so that the jets discharged thereby point more or less toward one end or the other of the block; the jets from these orifices creating vortices which clean the cylinder bores in the block. Fig. 6 shows the several different settings of the orifices relatively to planes at right angles to the axis of the element. Thus the orifice 184 is inclined sharply in the forward direction; the orifice 185 is also inclined forwardly, but at an angle which is less sharp; orifice 186 is inclined toward the rear; and orifice 187 is radial.

The stationary jetting element 30 is a bent tube closed at its front end as best shown in Fig. 10. It is provided with a radial extension 188 having a jetting orifice 189 and with orifices 190, some shown in full lines and others in dotted lines, distributed along the inner and under side of the same, and at the forward end, two nipples 192.

The element 32 is a straight pipe having its front end closed and, adjacent to that end, two oppositely disposed, aligned, small branch pipes 193 and 194 each containing an orifice 195. A row of orifices 196 extends along the length of the element on the same side of the latter as are the orifices 195.

The elements 33, 33 are alike except they are respectively right and left so as to be symmetrical with respect to a vertical plane midway between the same. As best shown in Figs. 11 and 12, each of these units comprises a pipe 197 into which the cleaning fluid enters. Paralleling this pipe is an elongated, flattened, closed shell 198 which may conveniently be a tube of large diameter closed at the ends and flattened except at the ends. The cylindrical ends of the member 198 are connected to the pipe 197 by short pieces of pipe 199. In the under flat side of the member 198 are groups of orifices, the orifices in each group being arranged in a circle which registers with a valve seat. At the center of each group of orifices there is preferably another orifice which will discharge a jet down through the center of a valve stem bore while the orifices of the surrounding group sweep the valve seats and scour the same clean. In the arrangement shown there are eight of these circular groups; these being of two kinds marked 200 and 201 respectively, in the drawings; the jets from orifices 200 being adapted to clean the seats and valve stem bores of the intake valves and the jets from the orifices 201 serving to clean the seats and valve stem bores of the exhaust valves. From the upper long edge of the member 198 rise short nipples 203, each containing on the inner side an orifice 204.

On the opposite side of the member 198 from that on which the pipe 197 is located is a pipe 205 bent into flattened U the ends of which are connected to the cylindrical end portions of the member 198 just opposite the connections 199. This pipe 205 has on the inner side a row of radial orifices 206.

It will of course be understood that the shapes and locations of the jetting elements, and the sizes, kinds and distribution of the orifices or nozzles, depend entirely upon the character of the work which, in the particular example chosen for illustration, happens to be the cylinder block of an eight cylinder, V type automobile engine or motor. Consequently, the principle of the invention, so far as these elements are concerned, is based, not on the particular details of the jetting elements illustrated, but simply upon any suitable construction and arrangement of jetting elements which will permit the engine block or other work to be placed in proper operative relation to the same upon insertion of the work in the housing; the jets to be such as effectively to clean all of the passages, bores or surfaces which it is desired to clean.

It is desirable, in many cases, to discharge jets against both ends of the cylinder block. The end of the block which is directed toward the rear wall of the housing may conveniently be acted upon by jets delivered from a pipe assembly 207 lying just in front of the rear wall of the housing, as best shown in Figs. 1 and 13. The main portion of this assembly is in the form of a hollow, inverted U, 208, which is connected at the center of its yoke portion to a pipe 209 that extends out through the rear wall of the housing through the vertical header 36. The member 208 has little branch pipes projecting therefrom in the plane thereof, and the sides of the member 208 and its branch pipes that face toward the front end of the housing containing orifices or nozzles 210 for discharging jets of cleaning fluid toward the front end of the housing. If it be desired to deliver jets against the end of the motor block which is toward the door when the block is in cleaning position, jetting means must be provided which may be moved into and out of position so as not to interfere with the entrance of the motor block into and its removal from the housing. Such an arrangement is illustrated in Figs. 27, 28 and 29 which shows a horizontal pipe 212, of considerable diameter, adapted to be connected at one end to the header 36, entering through the rear wall of the housing, close to the top. Telescoped within this pipe, and slidable lengthwise, is a smaller pipe 213. A suitable stuffing box 214 provides a fluid-tight joint between the pipes 212 and 213. On the forward end of the pipe 213 is a cross pipe 215 which is rotatable about its long axis and is provided with axle extensions 216 which form with the same an axle extending across the interior of the housing. On the ends of this axle are flanged wheels 217 which are interlocked with and run along horizontal tracks 218 extending from front to rear of the housing in the same plane as the pipe 212. Connected to the ends of the cross pipe 215 and depending therefrom are two pipes 219 and 220 that are long enough to reach to the bottom of the housing when they are in upright positions. The lower ends of the pipes 219 and 220 are connected by a pipe or cross piece 221 which is secured to an axle 222 extending across the housing and provided at its ends with flanged wheels 223 that ride along and are interlocked with vertical tracks or guides 224 lying rearwardly of the transverse plane that contains the axis of the piston rod 24. The connection between the member 221 and the axle 222, which may conveniently comprise straps or bands 225 fastened to the member 221 and passing loosely around the axle, may be such that the member 221 and the axle 222 can turn independently of each other. The bracket 25 to which the lower end of the door-operating piston rod 24 is pinned may be extended rearwardly far enough to receive the axle 222, as best shown in Fig. 28. Therefore, the axle 222 moves up and down with the door. Since the member 221 is connected to the axle 222, it is compelled to move up and down with said axle, although permitted to swing about the axle. The distance between the upper axle composed of the parts 215 and 216, and the axle 222 is fixed and, therefore, whenever the axle 222 moves up or down, the upper axle, being constrained to travel in the tracks or guides 218, can only move forwardly and rearwardly. Therefore, when the door is closed, the parts take the positions shown in full lines in Fig. 27. Upon raising the door, the structure composed of the vertical pipes 219 and 220 and the cross member 221 must take on a swinging movement, the lower end traveling upwardly, and the upper end rearwardly. When the door is fully open, the members 219, 220 and 221 lie in the top of the housing, in the position shown in dotted lines in Fig. 27.

The pipes 219 and 220 are bent rearwardly from points near their upper ends, so that the upper sections thereof, 226, are inclined toward the rear and thus bring the upper axle rearwardly of the lower axle when the door is shut and provide a sufficient lateral component of the lifting force against the upper axle to force it toward the rear, without binding.

The pipes 219 and 220 may be provided with suitable jetting orifices on their rear sides, as indicated at 227, and they may have lateral branches, such as indicated at 228, also provided with orifices, as indicated at 229, for example. Thus, when the door is closed after a motor block has entered the housing, the swinging jetting means just described moves down behind the motor block and, when cleaning fluids are admitted to the header 36, some of it enters the jetting apparatus in the front of the housing and thus makes it possible to deliver jets toward the rear of the housing and against surfaces or into passages or bores facing the door.

It should be noted that, as best shown in Fig. 1, the bottom of the door has cut into the same, through the lower edge, notches 230 of the same shape as the cross section of the tracks or rails 1 on which the carriage runs. These notches register with the tracks or rails so as to fit over the latter when the door is down.

The cylinder block may, of course, be accurately centered on the turntable in any suitable manner. Thus, as shown in Figs. 13 and 14, there may be a stop 231 on the turntable near one end, against which the advance end of the motor block may bear, while rollers 232 arranged in parallel longitudinal rows, spaced far enough apart to receive the block between them, engage opposite sides of the block. Near the other end of the turntable are suitable latches or bolts 233, controlled by a handle 234. When the handle is in one position, the bolts or latches are retracted and the block may be slid onto or from the turntable. After a cylinder block has been slid in place against the stop 231, the handle 234 is shifted into its second position, causing the latches or bolts to move into positions overlapping the trailing end face of the block. The details of this centering and holding arrangement are not important because any suitable means may be employed for this purpose.

It is believed that the operation and manner of using our improved apparatus has been sufficiently explained in conjunction with the description of the structural features, to make it unnecessary to add further explanation. It may be said, however, that the particular apparatus illustrated is one intended to discharge jets of steam or compressed air, depending upon which of the pilot valves is being held open. Should only one kind of fluid be required, obviously a single pilot valve would be sufficient to cause the opening and closing of the single main valve that would then be used. Instead of gaseous fluids or vapors, liquids, such as kerosene, for example, may be employed, either alone or alternating with other liquid or gaseous fluids.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. In combination, a housing having a door opening, a door for said opening, a work-supporting carriage movable into said housing through said opening, an actuator for said door, apparatus for cleaning work on said carriage, means controlled by said carriage to energize said actuator and cause the door to close after the carriage has entered the housing, and means controlled by the door to cause the cleaning apparatus to operate upon the closing of the door.

2. In combination, a housing having a door opening, a door for said opening, a work-supporting carriage movable into said housing through said opening, an actuator for said door, apparatus for cleaning work on said carriage, means controlled by said carriage to energize said actuator and cause the door to close after the carriage has entered the housing, means controlled by said door to cause the cleaning apparatus to begin a cleaning operation upon the closing of the door and to stop upon the completion of such cleaning operation, and means to energize said door actuator upon the completion of a cleaning operation and cause the door to open.

3. In combination, a housing having a door opening, a door for said opening, a work-supporting carriage movable into said housing through said opening, an actuator for said door, apparatus for cleaning work on said carriage, a motor to move said carriage into and out of the housing, a motor for opening and closing said door; and controlling means for said motors and said apparatus, including a manually-operable element, to cause the carriage to enter the housing, the door to close, the cleaning apparatus to execute a cleaning cycle, the door to open again, and the carriage to be moved out of the housing.

4. In combination, a housing having a door opening, a door for said opening, a carriage movable into and out of the housing through said opening, means controlled by said carriage for closing the door after the carriage has entered the housing, an actuator for the carriage, and means controlled by the door to energize said actuator and cause the carriage to be moved out of the housing when the door is opened while the carriage is in the housing.

5. In combination, a housing having a door opening, a door for said opening, a work-supporting carriage movable into said housing through said opening, an actuator for said door, an actuator for the carriage, a manually operable controller to effect energization of the actuator for the carriage and cause the carriage to move into the housing, apparatus for cleaning work on said carriage, means controlled by said carriage to energize the door actuator and cause the door to close after the carriage is in the housing, means controlled by the closing of the door to cause the cleaning apparatus to perform a predetermined operation and then to cause the door actuator to be energized and open the door.

6. In combination, a housing having a door opening, a door for said opening, a work-supporting carriage movable into said housing through said opening, an actuator for said carriage, an actuator for said door, apparatus for cleaning work on said carriage, a manually operable controller to effect energization of the carriage actuator and cause the carriage to enter the housing, means controlled by said carriage to energize door actuator and cause the door to close after the carriage has entered the housing, means controlled by said door to cause the cleaning apparatus to begin a cleaning operation upon the closing of the door and to stop upon the completion of such cleaning operation, means to energize said door actuator upon the completion of a cleaning operation to cause the door to open, and means to effect energization of the carriage actuator upon the opening of the door and cause the carriage to move out of the housing.

7. In combination, a housing having a door opening, a door for said opening, a work-supporting carriage movable into said housing through said opening, an actuator for said door, apparatus for cleaning work on said carriage, a motor to move said carriage into and out of the housing, a motor for opening and closing said door; a controlling system for said motors and said apparatus to cause the carriage to enter the housing, the door to close, the cleaning apparatus to execute a cleaning cycle, the door to open again, and the carriage to be moved out of the housing; a two-position controller for the carriage motor having a position in which it causes the carriage to be moved into the housing and a second position in which it causes the carriage to move out of the housing again, said controller being adapted to be moved manually into the first position to cause the cycle to begin; and means controlled by the said door to cause said controller to be moved into its second position when the door opens.

8. In combination, a housing having a door opening, a door for said opening, a work-supporting carriage movable into said housing through said opening, a reciprocable pneumatic actuator for said door, a reciprocable pneumatic actuator for the carriage, a controlling valve for the actuator for the carriage, tending constantly to assume a position to cause the carriage to move out of the housing, and movable manually into a position for causing the carriage to move into the housing, a catch to hold the valve in the last-mentioned position, and means controlled by the opening of the door to release said catch and permit the valve to assume the position that causes the carriage to move out of the housing.

9. In combination, a housing having a door opening, a door for said opening, a work-supporting carriage movable into said housing through said opening, a reciprocable pneumatic actuator for said carriage, a reciprocable pneumatic actuator for said door, apparatus for cleaning work on said carriage, separate valves for controlling the respective actuators, each valve having a position in which it causes the corresponding actuator to move in one direction and a second position in which it causes that actuator to move in the opposite direction, each valve tending constantly to assume one of its positions, a catch for each valve to hold it in the other of its positions, a manually-operable lever for the carriage valve, and means operated by an opening movement of the door to trip the catch for the last-named valve, means operated by said carriage to move the valve for the door actuator into the second of its positions, an electro-magnetic device to release the catch for the last-named catch, and means controlled by said cleaning apparatus to cause said electromagnetic device to be energized.

10. In combination, a housing having a door opening, rails extending through said door opening, a carriage mounted on said rails for movement from an exterior station into and out of the housing, a turntable on said carriage to support a piece of work, actuating means for driving said carriage in both directions along said track, a two-position controller for said actuating means adapted to be shifted manually into the position to cause the carriage to be moved into the housing, and means cooperating with the turntable to prevent said controller from assuming its last-named position when the carriage is at said station and the turntable stands in a predetermined angular position on the carriage.

11. In combination, a housing having a door opening and a vertically slidable door therefor, jetting devices in the housing, one of said devices being movable, means supporting one end of the latter device in the top of the housing for movements from and toward the door, and a hinge connection between the other end of the latter device and the lower end of said door to cause the device to be shifted into a position out of the path of movement of a piece of work entering the housing through said door opening upon the opening of the door and into a position between the door and the work when the door is closed.

FRED C. AREY.
DE LOS E. HIBNER, Jr.